Jan. 31, 1961 H. P. LUHN 2,969,876

INFORMATION SEARCHING DEVICE

Filed July 14, 1955 3 Sheets-Sheet 1

INVENTOR
HANS P. LUHN

BY Joe L. Koerber

ATTORNEY

INVENTOR
HANS P. LUHN
BY Joe L. Koerber
ATTORNEY

INVENTOR
HANS P. LUHN

BY *Joe L. Koerber*

ATTORNEY

United States Patent Office 2,969,876

Patented Jan. 31, 1961

2,969,876

INFORMATION SEARCHING DEVICE

Hans P. Luhn, Armonk, N.Y., assignor to International Business Machines Corporation, New York, N.Y., a corporation of New York Filed July 14, 1955, Ser. No. 522,072

2 Claims. (Cl. 209—110)

This invention relates to an information searching device. More particularly, it relates to a device for scanning data on record cards, for comparing said scanned data with data contained in a question card, and for selecting all cards containing data matching the question card data.

The prior art discloses elaborate machines and circuits for comparing data and for selecting records containing matching data. Some of the shortcomings of these searching machines are the complexity of structure and circuits, the high cost of building these machines and the problem of recording sufficient data on the record to be scanned. The present invention is structurally simple and has a minimum of circuitry. A scheme of superimposed coding is utilized to condense a relatively large amount of information in a relatively small recording space.

Superimposed coding is a scheme of coding which permits the recording of a plurality of items within a common field. This type of coding is advantageous in many cases where an undetermined number of items must be recorded and where it therefore becomes impractical or impossible to provide an unlimited number of individual fields. A further advantage lies in the possibility of scanning a single field instead of an undetermined number of individual fields. By scanning a single field, all data recorded in that field may be compared with selected question data in a single pass of the card through the comparing station.

The major problem in using superimposed coding is that of minimizing the accidental formation of meaningful but erroneous codings. A number of schemes have been established solving this problem to varying degrees. The safest scheme provides a field with as many hole positions as there are items to be recorded. However, since available punched card systems provide space for only a few hundred items, this scheme appears to be impractical and superimposed coding schemes must be reverted to in order to condense information into the available space.

A new superimposed coding scheme, described in detail hereinafter, is proposed which overcomes some of the difficulties encountered in handling superimposed coding in standard punched card machines.

The principal object of this invention is to provide an improved searching device.

Another object of this invention is to provide a simple and improved circuit for comparing data from two sources.

Yet another object of the invention is to provide a novel manner of recording coded data in a superimposed fashion upon a record card.

Another object of the invention is to provide improved means for scanning superimposed coded data for comparison with question data and for selecting record cards containing matching data.

A further and more specific object of the invention is to provide a simple resistor network circuit for comparing data from two sources.

Other objects of the invention will be pointed out in the following description and claims and illustrated in the accompanying drawings, which disclose, by way of example, the principle of the invention and the best mode, which has been contemplated, of applying that principle.

Figure 3:
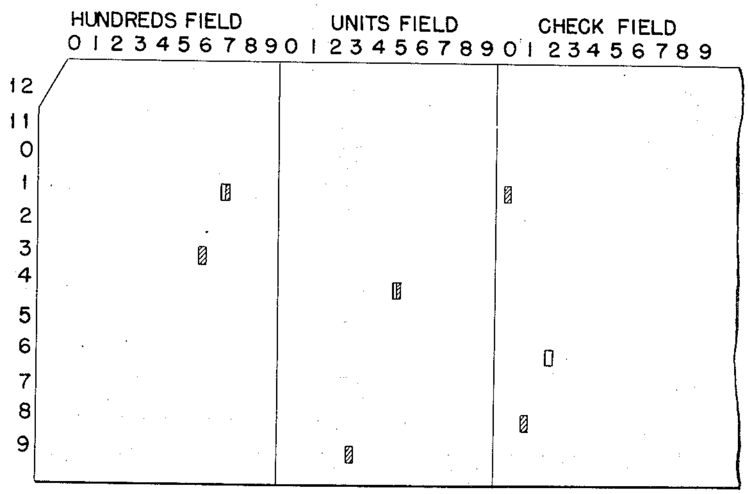
Figure 4:
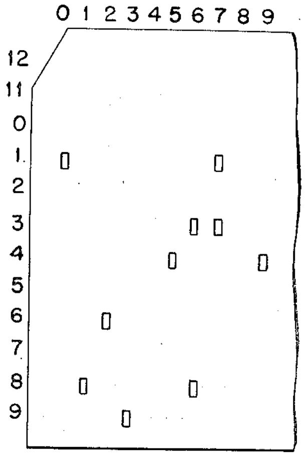
Figure 5:
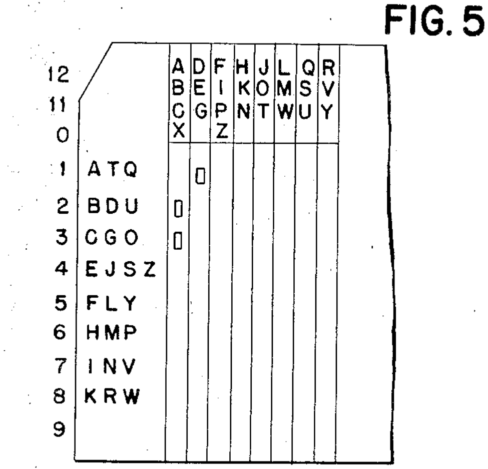

Figs. 3, 4, and 5 show record cards marked in accordance with superimposable codes.

Figure 6:
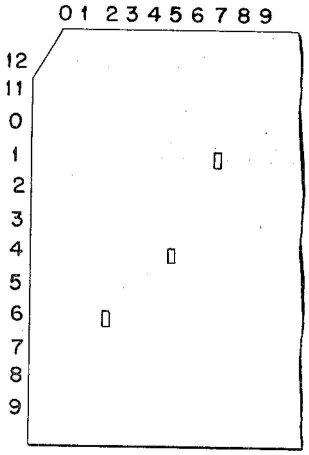

Fig. 6 shows a question card marked in accordance with particular data in a superimposable code.

*General description*

Figure 1:
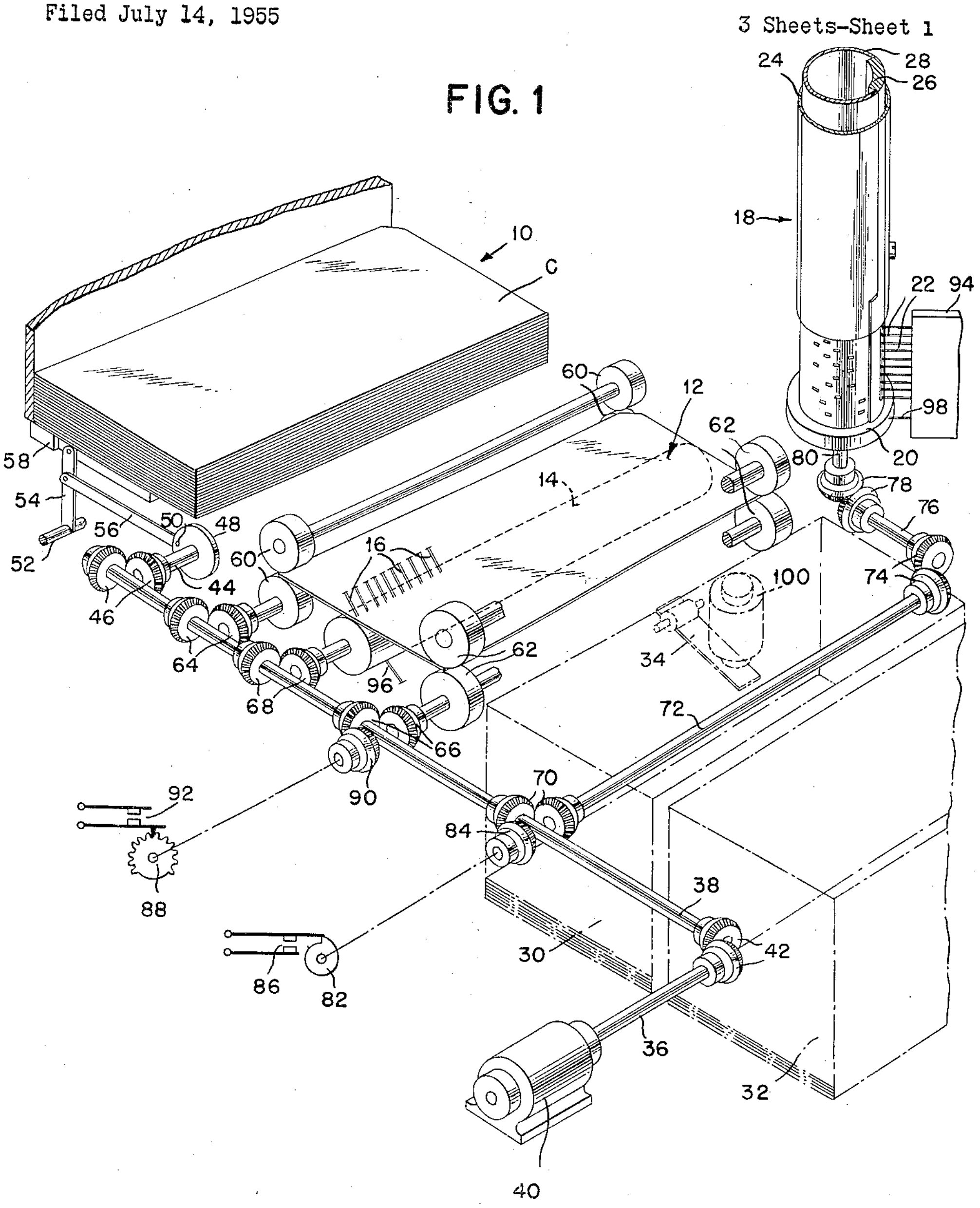
Fig. 1 shows card feeding, sensing, selecting and stacking means.

Referring to Fig. 1, this device comprises a card feed hopper 10, a sensing station 12 including a driven contact roll 14 and a plurality of contact brushes 16 for sensing holes in record cards, a question station 18 including a driven contact roll 20 and a plurality of contact brushes 22, a cylinder 24 and spline 26 for fixing a question card 28 on the contact roll 20 for sensing by the contact brushes 22 as the contact roll 20 is rotated in synchronism with a passage of record cards past the sensing station 12, a pair of card receiving pockets 30 and 32 and a sorting station including card feed rollers 62, deflector armature 34 for guiding record cards selectively into either of two pockets, and control magnet 100. A card feed mechanism, the contact roll 20 and the sensing station contact roll 14 are driven through shafts 36 and 38 by a motor 40.

As the record cards are fed serially past the sensing station 12, the data recorded therein are sensed by the contact brushes 16 and, through circuitry to be described hereinafter, are compared with question data concurrently sensed at the question station 18. Normally the magnet 100 is actuated for each card and the cards ride over the pocket 30 and are fed into the pocket 32. However when a matching condition is detected between the question card data and data on a detail card, the magnet 100 is not actuated and cards are deflected into the pocket 30.

*Detail description*

Referring to Fig. 1, the motor 40 is suitably mounted on the frame of the machine and drives the shaft 36, and through bevel gears 42, drives the shaft 38. From the extreme left end of the shaft 38, a shaft 44 is driven through bevel gears 46. Mounted on the opposite end of the shaft 44 to a disc 48 having an eccentrically placed hole 50. A shaft 52 is journaled in the machine frame work and carries an arm 54. Pivotally pinned to the arm 54 is a rod 56, the other end of which carries a pin (not shown) pivotally engaging the hole 50. The end of the arm 54 opposite the shaft 52, pivotally mounts two card feed knives 58 (one shown). Through rotation of the shaft 38 and the disc 48, the card feed knives 58 are reciprocated to feed records C one at a time from the hopper 10.

Sets of feed rolls 60 and 62 are driven by the shaft 38 through bevel gears 64 and 66 respectively. The contact roll 14 is driven by the shaft 38 through bevel gears 68. The question station contact roll 20 is driven by the shaft 38 through bevel gears 70, and shaft 72, bevel gears 74, a shaft 76, bevel gears 78, and a shaft 80.

The machine operates by card cycles consisting of, in the embodiment shown, sixteen cycle points each. During twelve cycle points, the twelve rows of a conventional Hollerith type card are sensed. The remaining four cycle points are required for moving the sensed record card from the sensing station 12 and for moving the next following record card to the sensing station. A cam 82 is driven by the shaft 38 through one of the bevel gears 70 and a bevel gear 84. The cam 82 is timed to close a pair of contacts 86 at the beginning of a card cycle and to open the contacts 12 cycle points later after the card has been sensed. During the remaining four cycle points the brushes 22 contact the area covered by the spline 26 which corresponds, in the sensing station 12, to the space between cards.

A second cam 88 is driven by the shaft 38 through one of the bevel gears 66 and a bevel gear 90. The cam is adapted to close and open a pair of contacts 92 once for each of the first twelve cycle points of a card cycle, and to maintain the contacts 92 in an open position during the remaining four cycle points while the brushes 16 are in contact with the roll 14 between cards.

Referring to the question station 18, the brushes 22 are mounted in a brush block 94 suitably mounted on the machine frame. The sensing station brushes 16 are similarly mounted in a brush block (not shown).

It will be apparent that any number of sensing brushes and a corresponding number of question station brushes may be provided within the scope of this invention. However, in the embodiment shown herein, ten brushes 16 are adapted to sense a field of ten consecutive columns of a record card C. A common brush 96, described more fully hereinafter, provides a common connection to the contact roll 14. A common brush 98 mounted in the brush block 94 provides a common connection to the question station contact roll 20. A reject magnet 100, described more fully hereinafter, actuates the deflector 34 when the reject magnet is energized.

To summarize the foregoing description, when the motor 40 is running, record cards C are fed one at a time from the hopper 10 into the feed rolls 60. The latter feeds rolls feed the record card between the contact roll 14 and the brushes 16 where the perforations are sensed by the brushes 16. As the rows 9 through 12 of a record card C are sensed by the brushes 16, corresponding rows 9 through 12 of the question card 28 are simultaneously sensed by the brushes 22. As the card emerges from the sensing station 12, the feed rolls 62 move it toward the pockets 30 and 32. If the reject magnet 100 is not energized, the deflector 34 remains in its down position and deflects the card into the select pocket 30. However, if the reject magnet 100 is energized, the deflector 34 is in its raised position and the card C is permitted to pass over the pocket 30 and into the reject pocket 32.

*Code*

Superimposed coding is a scheme which permits recording of a plurality of items within a common field on punched cards. This type of coding is advantageous in most cases where an undetermined number of items must be recorded and where it therefore becomes impossible to provide an unlimited number of individual fields. A further advantage lies in the possibility of scanning a single field instead of an undetermined number of individual fields.

The major problem in using superimposed coding is that of minimizing the accidental formation of meaningful but unwanted codings. A number of schemes have been established solving this problem in varying degrees. The safest scheme provides a field with as many hole positions as there are items to be recorded. However, since available punched card systems provide space for only a few hundred items, this scheme appears to be impractical and superimposed coding schemes must be reverted to in order to condense information into the available space.

Referring to Fig. 3, a new superimposed coding scheme is proposed which will overcome many of the difficulties encountered in handling superimposed coding in standard punched card machines and which has the following features:

*a.* It is a numbers code.

*b.* Certain existing codes may be transformed into a superimposable code by merely adding certain digits thereto.

*c.* The additional digits may be derived from the original digits by a simple arithmetic operation.

*d.* The identity of individual code representations may be reconstructed from a mixture of punchings by a simple arithmetic method.

*e.* Cards may be produced by standard punch, gang punch or reproducer.

In the cases where up to ten thousand items are involved, it is presumed that these items are represented by numbers from 0000 to 9999. These four digit decimal numbers are then transformed into two digit centesimal numbers. For example, the number 1745 is considered as 17—45, where the first two digits represent the hundred digit and the last two digits represent the unit digit of a centesimal number. One way to record this type of number in the card is to provide two fields ten columns wide by ten rows deep or one hundred possible holes each. Inasmuch as each centesimal digit is represented by two decimal digits, ranging from 00 to 99, this notation may be used to locate the centesimal digits within the recording fields. The first digit of the number 17 determines the row, and the second digit determines the column in which the hole is to be punched. For instance, in the example given, the hundred centesimal digit 17 is represented as a hole in row one and column seven of the hundred digit centesimal field, Fig. 3, while the unit centesimal digit 45 is represented as a hole in row four and column five of the unit centesimal field.

In order to protect the identity of numbers thus recorded, a third centesimal digit may be added which is derived by adding the hundred and unit centesimal digits and casting out hundreds. This centesimal digit is punched in the third centesimal field. For example, the number 62 is annexed to 17—45 so that the full number reads 17—45—62. Other exemplary numbers involving the casting out of hundreds are, 17—93—10; 36—45—81; and 49—37—86, and are shown by shaded holes in Fig. 3. It will be noted that the hole representing the centesimal number 17 in Fig. 3 is half shaded indicating that the hundreds digit of the first example and the second example coincide. Similarly the units digit of the first and third examples coincide. Using the three centesimal fields as described, it is possible to identify a group of numbers punched in the recording field comprising the three groups of ten columns each. Either a hundred or a unit centesimal digit is subtracted from a check centesimal digit and the presence of the difference in the remaining centesimal field establishes the relationship of the three centesimal digits. For example $$62-45=17$$

It will be apparent that, using the hereinbefore described centesimal system, having the hundred centesimal digit, the unit centesimal digit and the check digit, thirty sensing brushes 16 and thirty question unit brushes 22 would be required. The same coding system with or without the check digit may be recorded in a single centesimal field comprising ten rows of punch positions by ten columns of punch positions. Using this latter system, the possibility of accidental formation of meaningful but unwanted codings is somewhat increased. However, for simplicity of showing and describing the invention, the single centesimal field and a group of ten sensing brushes 16, and ten question brushes 22 is shown and described. Fig. 4 shows a card having a single field in which all the data shown in Fig. 3 is recorded. It will be apparent that the described structure may be expanded, within the scope of the invention, to function with the three field coding system.

The centesimal system may be extended to cover one million combinations by adding another significant centesimal digit and another check digit, the latter representing the sum of the first check digit and the new significant centesimal digit, for example, 17—45—62—83—45. The checking calculation then takes this form: 17+45=62+83=45. Another coding system which may be used with the structure shown and described herein, is an alphabetic code. For example, assume that the letters CAD represents a code word. The code word is represented by three holes. These three holes may be placed in three consecutive fields each comprising eight rows by eight columns, in a manner similar to the centesimal scheme described hereinbefore, or the three holes may be superimposed in a single field comprising eight rows of punch positions by eight columns of punch positions. The eight rows and eight columns represent alphabetic characters as shown in Fig. 5. The three holes are determined in accordance with adjacent characters of the code word and the first and last characters of the code word as follows: CA AD DC. The locations of the hole is determined by seeking the point of intersection of the horizontal rows and vertical columns; for example, the horizontal row C, Fig. 5, and the vertical column A; the horizontal row A and the vertical column D; the horizontal row D and the vertical column A.

The selecting of record cards marked in accordance with any of the hereinbefore described codes is accomplished by setting up desired question data in a question card in accordance with the particular code being used and then testing for the presence of all question holes in a single record card C as it passes the sensing station 12.

Using any of the hereinbefore described code systems, a plurality of data representations may be punched in record cards in a superimposed manner, for example, as in Fig. 4, and the machine circuitry is designed to indicate when all of the data punched in the question card 28 is matched by data in a detail card C. A question card is shown in Fig. 6 and punched with the question data 17—45—62.

*Circuits*

Figure 2:
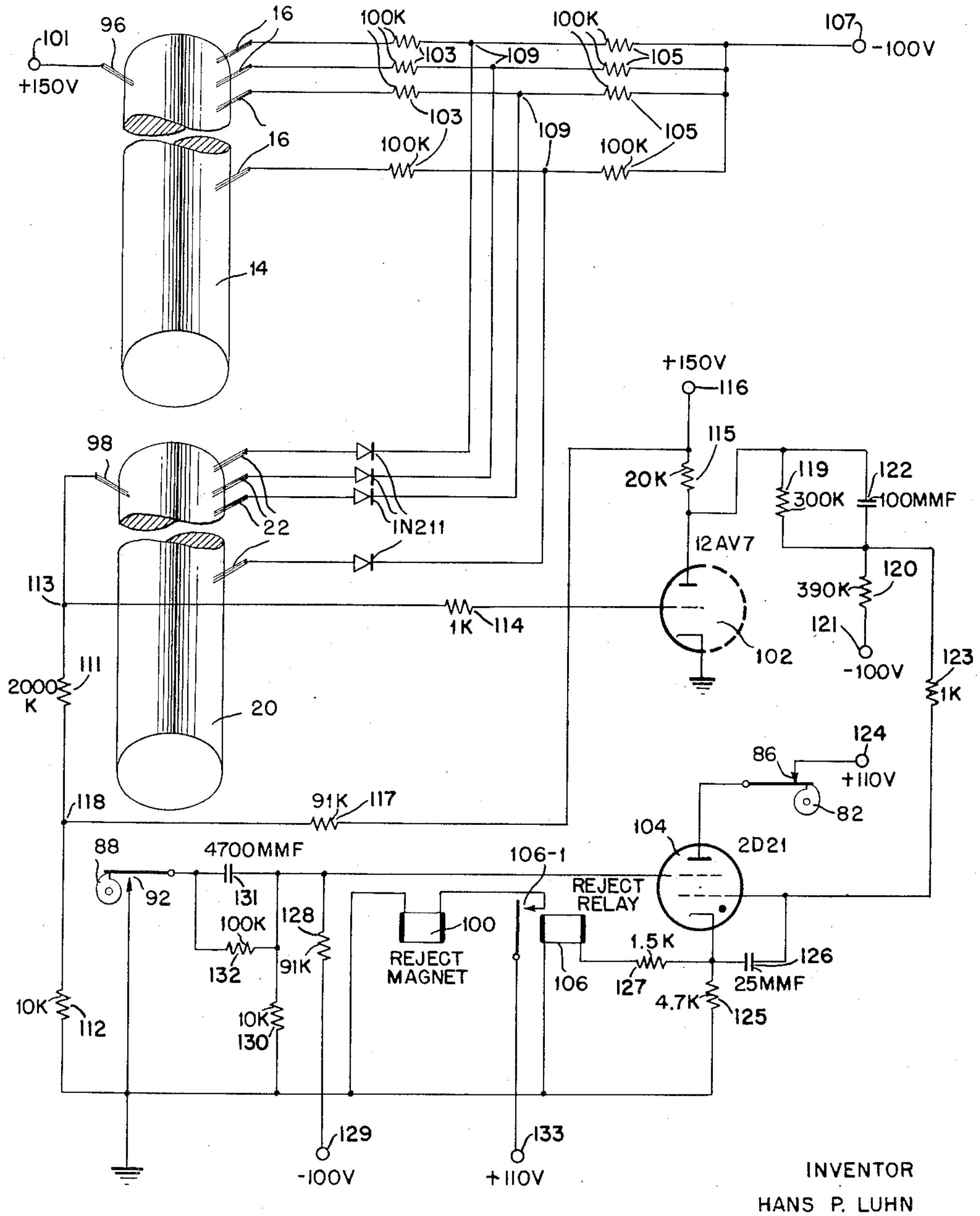
Fig. 2 is a schematic showing of the comparing and selecting circuits.

Referring to Fig. 2, the machine circuitry is shown, including the cams 86 and 88 and the contacts 82 and 92. Also shown are the contact rolls 14 and 20, the sensing brushes 16 and 22, the common brushes 96 and 98, and the reject magnet 100.

The common brush 96 is connected to a plus 150 volt supply terminal 101. Each sensing brush 16 is connected through two series connected 100 thousand (100K) ohm resistors 103 and 105 to a minus 100 volt supply terminal 107. The mid-point 109 of each pair of 100K ohm resistors 103 and 105 is connected through a IN211 type rectifier to a corresponding one of the question station brushes 22.

The common brush 98 is connected to ground through series connected 2000K ohm resistor 111 and 10K ohm resistor 112. The junction 113 of the common brush 98 and the resistor 111 is connected through a 1K ohm resistor 114 to the left-hand grid of a 12AV7 type dual triode 102. The left-hand cathode is connected to ground and the left-hand plate is connected through a 20K ohm resistor 115 to a plus 150 volt supply terminal 116. The supply end of the resistor 115 is tied through a 91K ohm resistor 117 to the junction 118 of the 2000K ohm and 10K ohm resistors in the circuit of the common brush 98. The plate end of the resistor 115 is connected through series connected 300K ohm and 390K ohm resistors 119 and 120 respectively to a minus 100 volt supply terminal 121. The resistor 119 is by-passed by a 100 micromicrofarad (100 mmf.) condenser 122. The junction of the resistors 119 and 120 is tied through a 1K ohm resistor 123 to the first grid of a 2D21 type gas tetrode 104. The plate of the tube 104 is tied through the normally closed cam contacts 86 to a plus 110 volt supply terminal 124. The cathode of the tube 104 is tied through a 4.7K ohm resistor 125 to ground. The first grid is coupled by a 25 micromicrofarad (25 mmf.) condenser 126 to the cathode end of the resistor 125. The latter point also is connected through a 1.5K ohm resistor 127 and the coil of a reject relay 106 to ground. The second grid of the tube 104 is tied through a 91K ohm resistor 128 to a minus 100 volt supply terminal 129 and in parallel with the resistor 128 through a 10K ohm resistor 130 to ground. The junction of the resistors 128 and 130 is tied through a 4700 micromicrofarad (47 mmf.) condenser 131 connected in parallel with a 100K ohm resistor 132 and through the normally open contacts 92 to ground. The normally open relay point 106–1 of the reject relay 106 is included in a circuit from a plus 110 volt supply terminal 133, through the point 106–1 and through the coil of the reject magnet 100 to ground.

The junction 118 is normally at about plus 135 volts due to the circuit from the terminal 116, through the series resistors 117 and 112 to ground. When the question card 28 passes under the question station sensing brushes 22 and a hole is sensed by a particular brush 22, a circuit is completed from the plus 135 volt potential at 118 through the resistor 111, the common brush 98, the contact roll 20, the hole in the card, the particular brush 22, the associated type IN211 diode, an associated one of the resistors 105 to the minus 100 volt supply terminal 107, thereby biasing below cut-off the normally conducting left half of the dual triode 102. The latter tube is normally conducting due to the grid being conditioned from the plus 135 volt potential at 118 through the 1K ohm resistor 114. When the left half of the tube 102 cuts off, the potential of the plate end of the resistor 115 rises and the potential of the first grid of the normally non-conducting tube 104, which is normally negatively biased also rises. Coincidentally with the sensing of hole positions by the brushes 22, the contacts 92 close, raising the potential of the second grid of the tube 104 to ground level and causing the latter tube to fire if a brush 22 has sensed a hole. When the tube 104 fires, the reject relay 106 picks up through the circuitry described hereinbefore. When the relay 106 picks up, its point 106–1 closes, completing a circuit through the reject magnet 100 which is energized and attracts the deflector 34, permitting the card C, then under the brushes 16, to advance to the reject pocket 32 at the end of the card cycle. The tube 104 is a gas tube and remains ignited until the end of the card cycle when the contacts 86 open thereby breaking the plate circuit. When the tube 104 is extinguished, the reject relay 106 drops out opening its point 106–1 and de-energizing the reject magnet 100, which releases the deflector 34 that returns to its down position wherein it will deflect cards into the select pocket 30. It is therefore apparent that each time a hole is sensed at an index point in the question card 28 by a brush 22 and a hole is not sensed at a corresponding index point in a detail card C by a corresponding brush 16, the bistable circuit comprising the tube 102, the thyratron 104, and the relay 106 is triggered to energize relay 100 deflecting the card C to the reject pocket.

Referring again to Fig. 2, it will be apparent that, when a detail card passes between the contact roll 14 and the brushes 16 and a hole is sensed by a brush 16, a circuit is complete from the plus 150 volt supply terminal 101 through the common brush 96, the contact roll 14, the hole in the card and the particular brush 16, through the respective series resistors 103 and 105 to the minus 100 volt supply terminal 107 thereby raising the junction 109 to approximately plus 25 volts. This change in voltage is ineffective unless a hole is coincidently sensed by the corresponding brush 22.

If a brush 16 senses a hole in a card C simultaneously with the sensing of a hole in the question card 28 by a corresponding brush 22, the potential across the resistor 111 is approximately 135—25=110 volts, instead of approximately 135+100=235 volts, as in the case when a hole is sensed only by the brush 22. A drop in potential at the grid of the tube 102 occurs but is not of sufficient magnitude to cut off the tube. The tube 102 remains in its conducting state, the tube 104 is not fired, the reject relay 106 and the reject magnet 100 are not picked up and the deflector 34 remains in its down position wherein it will deflect the card C into select pocket 30. From the foregoing description, it will be clear that if each hole in the question card 28 is matched by a hole in the card C, then at the sensing station, the reject magnet 100 is not energized and the card C is selected in the pocket 30. However, if any hole in the question card 28 is not matched by a hole in the card C, then at the sensing station, the reject magnet 100 is energized, the deflector 34 is raised and the card C is rejected into the pocket 32. The non-matched hole in the question card 28 may be in any of the ten rows since the gas tube 104, once fired, remains fired until the end of that card cycle when the contacts 86 open. If a hole is sensed by a brush 16 and one is not sensed by the corresponding brush 22, the sensing of the hole by the brush 16 has no effect whatever on the tube 102 because there is an open circuit between the corresponding brush 22 and the brush 98 and therefore the grid voltage of the tube 102 is unaffected.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a device for sorting data bearing detail records into two groups, one of said groups containing all detail records having data matching a question record and the other group containing all other detail records, a first sensing means, means for feeding said detail records successively past said first sensing means in a predetermined manner, a second sensing means, means for repeatedly feeding said question record past said second sensing means in a manner such that index points on said question record are sensed simultaneously with the sensing of corresponding index points on said detail records, sorting means, means responsive to the sensing of data at an index point in said question record for activating said sorting means, and means responsive to a sensing of data at an index point of a detail record simultaneously with the sensing of data at a corresponding index point of said question record for inhibiting said activating means.

2. A device for sorting data bearing detail records into two pockets, a select pocket receiving all detail records having data matching data on a question record, and a reject pocket receiving all other detail records, comprising means for sensing the data on the detail records at a first sensing station, means for successively feeding said detail records past the first sensing station in a predetermined manner and on to said select or reject pocket, means for sensing the data on said question record at a second sensing station, means for repeatedly feeding said question record past said second sensing station in a manner such that index points on said question record are sensed simultaneously with the sensing of corresponding index points on said detail records, bistable means triggered by the sensing of data at an index point on said question record, means responsive to the sensing of data at an index point of a detail record simultaneously with the sensing of data at a corresponding index point of said question record for inhibiting the triggering of said bistable means, means normally directing said detail records into said select pocket, means operable in response to the triggering of said bistable means for directing said detail record into said reject pocket, and means for resetting said bistable means before the sensing of each detail record.

References Cited in the file of this patent

UNITED STATES PATENTS

| | | |
|---|---|---|
| 1,933,357 | Weinlich et al. | Oct. 31, 1933 |
| 1,944,692 | Maby | Jan. 23, 1934 |
| 2,150,256 | Warren | Mar. 14, 1939 |
| 2,319,108 | Broido | May 11, 1943 |
| 2,531,895 | Shafer et al. | Nov. 28, 1950 |
| 2,602,544 | Phelps et al. | July 8, 1952 |
| 2,615,333 | Gardinar et al. | Oct. 28, 1952 |